United States Patent [19]

Barski et al.

[11] Patent Number: 4,949,392
[45] Date of Patent: Aug. 14, 1990

[54] DOCUMENT RECOGNITION AND AUTOMATIC INDEXING FOR OPTICAL CHARACTER RECOGNITION

[75] Inventors: Lori L. Barski, North Chili; Roger S. Gaborski, Pittsford, both of N.Y.

[73] Assignee: Eastman Kodak Company, Rochester, N.Y.

[21] Appl. No.: 196,513

[22] Filed: May 20, 1988

[51] Int. Cl.$^5$ .............................................. G06K 9/20
[52] U.S. Cl. ..................................... 382/61; 358/467; 382/18; 382/30
[58] Field of Search ....................... 382/61, 30, 18, 69, 382/1, 17, 33, 42; 358/467, 261.1; 356/71; 209/534

[56] References Cited

U.S. PATENT DOCUMENTS

| | | | |
|---|---|---|---|
| 3,846,752 | 11/1974 | Nakano et al. | 382/30 |
| 4,020,462 | 4/1977 | Morrin, II | 382/56 |
| 4,208,652 | 6/1980 | Marshall | 382/18 |
| 4,231,014 | 10/1980 | Ponzio | 382/18 |
| 4,504,969 | 3/1985 | Suzuki et al. | 382/61 |
| 4,559,649 | 12/1985 | Kataoka et al. | 382/9 |
| 4,686,704 | 11/1987 | Kamada et al. | 382/61 |
| 4,688,088 | 11/1987 | Hamazaki et al. | 382/18 |

FOREIGN PATENT DOCUMENTS

262462A2 9/1987 European Pat. Off. .

OTHER PUBLICATIONS

Gonzales et al., "Digital Image Processing", Addison-Wesley Publishing Co., 1977, pp. 67-70.
IBM Technical Disclosure Bulletin, vol. 13, No. 2, Jul. 1970, J. E. Carrington, "Line Finding by Profile Analysis", pp. 351-352.
Proceedings of the Eighth Conference on Pattern Recognition, 27-31 Oct. 1986, Paris, IEEE, Y. Nakano, "A Document Understanding System Incorporating with Character Recognition", pp. 801-803.

Primary Examiner—Leo H. Boudreau
Assistant Examiner—Joseph Marcus
Attorney, Agent, or Firm—Dennis R. Arndt

[57] ABSTRACT

A library of templates defining the spacings between pre-printed lines and the corresponding line lengths for a plurality of different business forms is compared with the image data of an unknown document to determine the known business form (template) to which the document corresponds. Once the form of the document is determined, the optical character recognition system may intelligently associate the text characters in certain locations on the document with information fields defined by the pre-printed lines. The pre-printed lines in the image data are determined from the corresponding template and removed from the image data prior to optical character recognition processing.

24 Claims, 4 Drawing Sheets

DOCUMENT RECOGNITION AND AUTOMATIC INDEXING FOR OPTICAL CHARACTER RECOGNITION

BACKGROUND OF THE INVENTION

1. Problem Solved by the Invention

Optical character recognition systems are useful for automatically reading the contents of a document for storage in a computer memory. An image sensor scans the document and generates image data, which the optical character recognition system transforms into text. The data representing the text is then immediately stored in a computer memory for instant access and processing by the user.

An important requirement is that the optical character recognition system either be able to distinguish between image data representing text characters and image data representing non-text things (e.g., printed lines), or else that the data representing printed lines or other non-text things be deleted from the image data before it is received by the optical character recognition system.

When processing a plurality of different business forms, the optical character recognition system may be more efficient if it knows the locations of the various fields in a given business form containing text characters. For example, if the business form is a sales order form, the data may be used more quickly if the system already knows the location on the form of certain critical information such as the price, quantity, type, delivery address, etc.. Knowing the location of the various fields on the form may also help the system orient the document image correctly in memory, or determine the boundary in the image data between one document and the next document.

Thus, the optical character recognition system needs to know to which one of a plurality of known business forms a particular document (represented by incoming image data) corresponds if it is to operate at the highest efficiency. Therefore, for maximum efficiency, the incoming documents must first be grouped according to type of business form before they are processed by the optical character recognition system. As each group of documents is fed to the system, the user must inform the system as to which type of business form the current group corresponds. The sorting or grouping function may require an unacceptably large amount of the user's time.

Thus, the problem is how to permit the optical character recognition system to operate at maximum efficiency without requiring the user to sort the incoming documents according to type of business form or to inform the system of the type of document about to be received.

2. Prior Attempts to Solve Related Problems

The necessity of first informing an image processing system of the type of form of an incoming document (i.e., the location of all of the printed lines characteristic of a business form) is illustrated, in the case of an image compression/de-compression system, in U.S. Pat. No. 4,020,462 to Morrin. According to the Morrin patent, once the user informs the system as to which form the incoming document corresponds, the system uses the known locations of the various printed lines on that form to cull out the text character data. U.S. Pat. No. 4,504,969 to Suzuki et al. illustrates how an image processing system can recognize rectangular patterns on a document stored as data in a memory, but only if the user first defines the patterns. The problem with such prior techniques is that the user's time and effort are required to provide information about the documents to the image processing system.

SUMMARY OF THE INVENTION

Object of the Invention

The goal of the invention is to permit an optical character recognition system to process a plurality of incoming documents whose correspondence with a plurality of predetermined business forms is completely random in a manner unknown to the system, without requiring the user to pre-sort the documents or to provide any information to the system identifying the documents. Specifically, the goal is to enable the system by itself to automatically determine to which one of a plurality of business forms each incoming document corresponds.

Solution to the Problem

The document recognition system of the invention is intended to be used as the "front end" of an optical character recognition system. After at least a portion of the image of an incoming document has been converted to image data, the image data is scanned by the document recognition system. In the preferred embodiment of the invention, this is done line-by-line. The document recognition system counts the number of "on" pixels (e.g., number of black pixels on a white background) in a given horizontal scan line, and (preferably) normalizes this number to the width of the line. After a plurality of such operations, the document recognition system creates in memory a curve or "graph" representing the density of "on" pixels as a function of horizontal line location. In a preferred embodiment, the locations of the pre-printed horizontal lines in the image data are determined by differentiating the curve and noting the locations of the resulting discontinuities (transitions between positive and negative slopes) in the differentiated data. A table of spacings between the pre-printed line locations is stored in memory.

The length of each pre-printed line (corresponding to each discontinuity in the differentiated curve data) is stored as a second table in memory.

The pair of tables thus constructed for the incoming document is compared with a library of "templates", or similar pairs of tables, previously constructed in a similar manner from a set of blank business forms each characterized by its own configuration of pre-printed lines. Assuming the library of templates is complete, each of the documents processed by the system will be automatically identified with the pre-printed line configuration of one of the templates. Furnishing this configuration (or template) to the optical character recognition system enables it to operate at maximum efficiency without requiring pre-sorting or inspection of the documents by the user.

In another embodiment of the invention, the foregoing processing is performed not only horizontally line-by-line but vertically "column-by-column" as well. In an alternative embodiment, the process may be simplified by eliminating the length of each line (the "second" table) as a template comparison criteria.

If the document recognition system does not find an exact "match" between the current document and one of the templates in the library, then the system determines which one of the templates has the closest correlation to the document and declares that template as the one matching the document in question. In a simple form, this is done by computing the cross-correlation between the line spacings of the template and the line spacings of the document in question.

DESCRIPTION OF THE DRAWINGS

The invention is described below in detail with reference to the accompanying drawings, of which.

DETAILED DESCRIPTION

Figure 1:
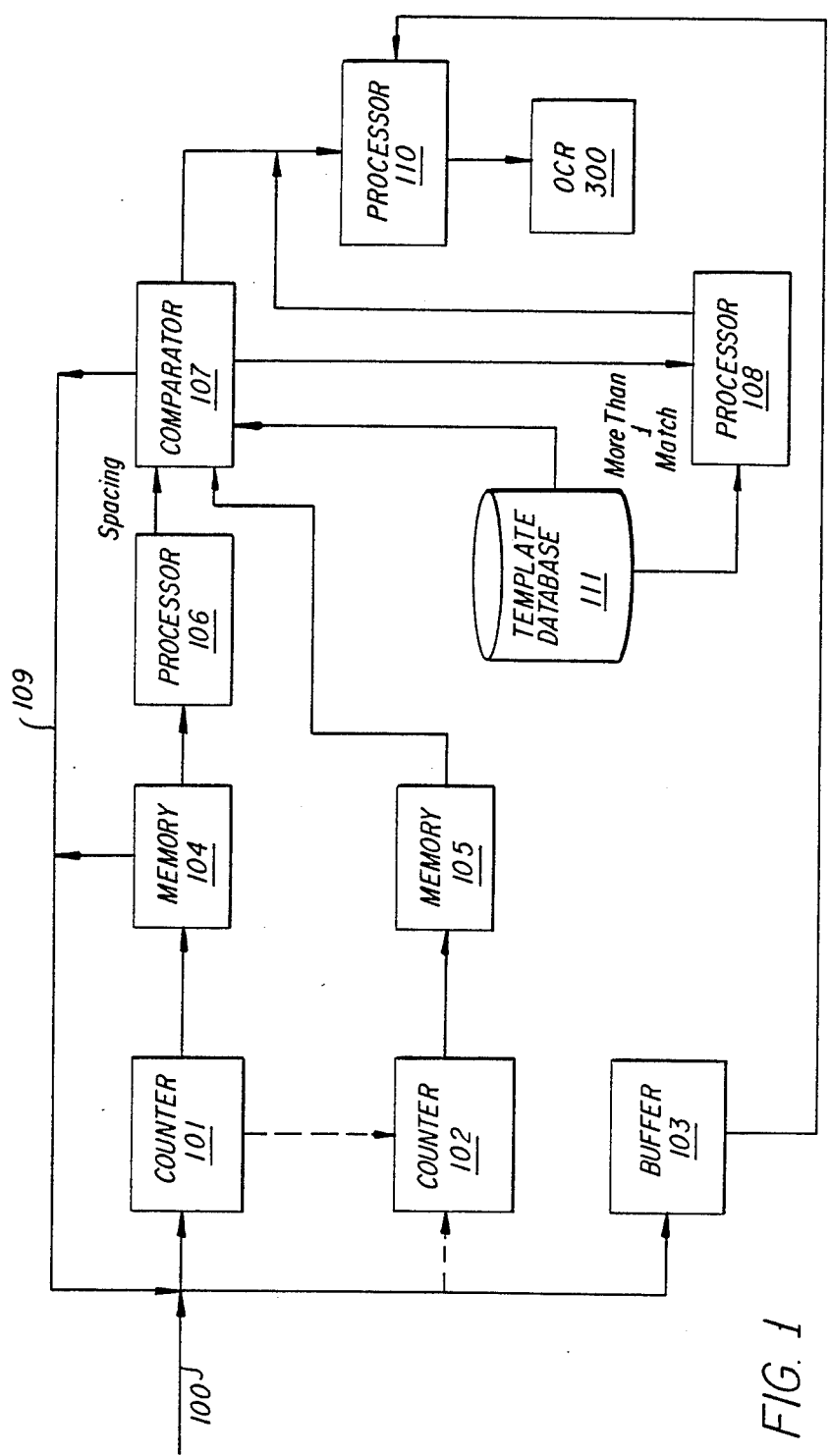
FIG. 1 is a block diagram illustrating the document recognition system of the invention.

Referring to FIG. 1, each horizontal "video" line of data representing a document whose form is unknown enters the document recognition system at an input node 100 and is saved in a buffer 103. A counter 101 counts the number of on or "black" pixels in each line of data, normalizes this count to the number of pixels in the video line and stores the result by line number in a memory 104. A counter 102 determines the length of the longest continuous "run" of black pixels in each video line of data and stores this length in a memory 105.

Figure 2:
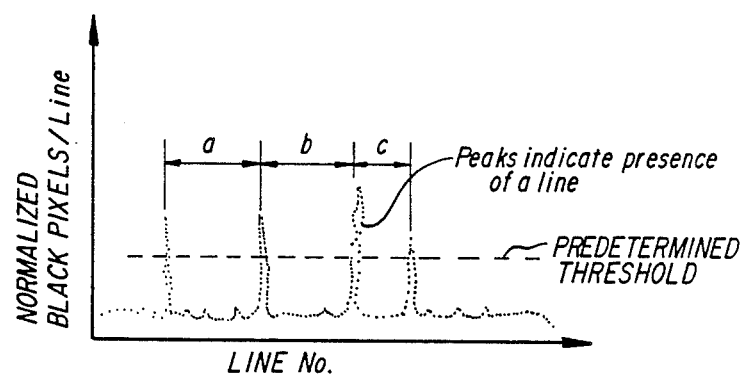
FIG. 2 illustrates an exemplary graph of black pixel density as a function of horizontal line position generated by the system of FIG. 1.

After a sufficient number of horizontal video lines have been thus processed, a processor 106 constructs a curve from the data stored in the memory 104, the curve representing the line density of the black pixels as a function of horizontal line number. One example of such a curve is illustrated in FIG. 2. The peaks in the curve of FIG. 2 which exceed a predetermined threshold (dashed line) indicate the locations of pre-printed lines in the image of FIG. 3. The processor 106 precisely locates these peaks and deduces therefrom the horizontal line location of each pre-printed line thus detected.

Figure 3:
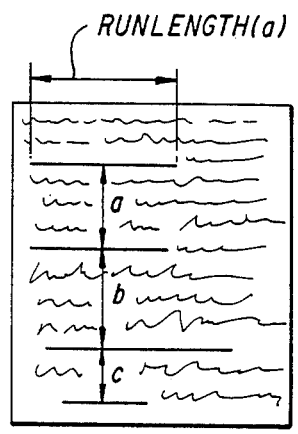
FIG. 3 illustrates the pre-printed line spacing on a document corresponding to the example of FIG. 2.
Figure 4:
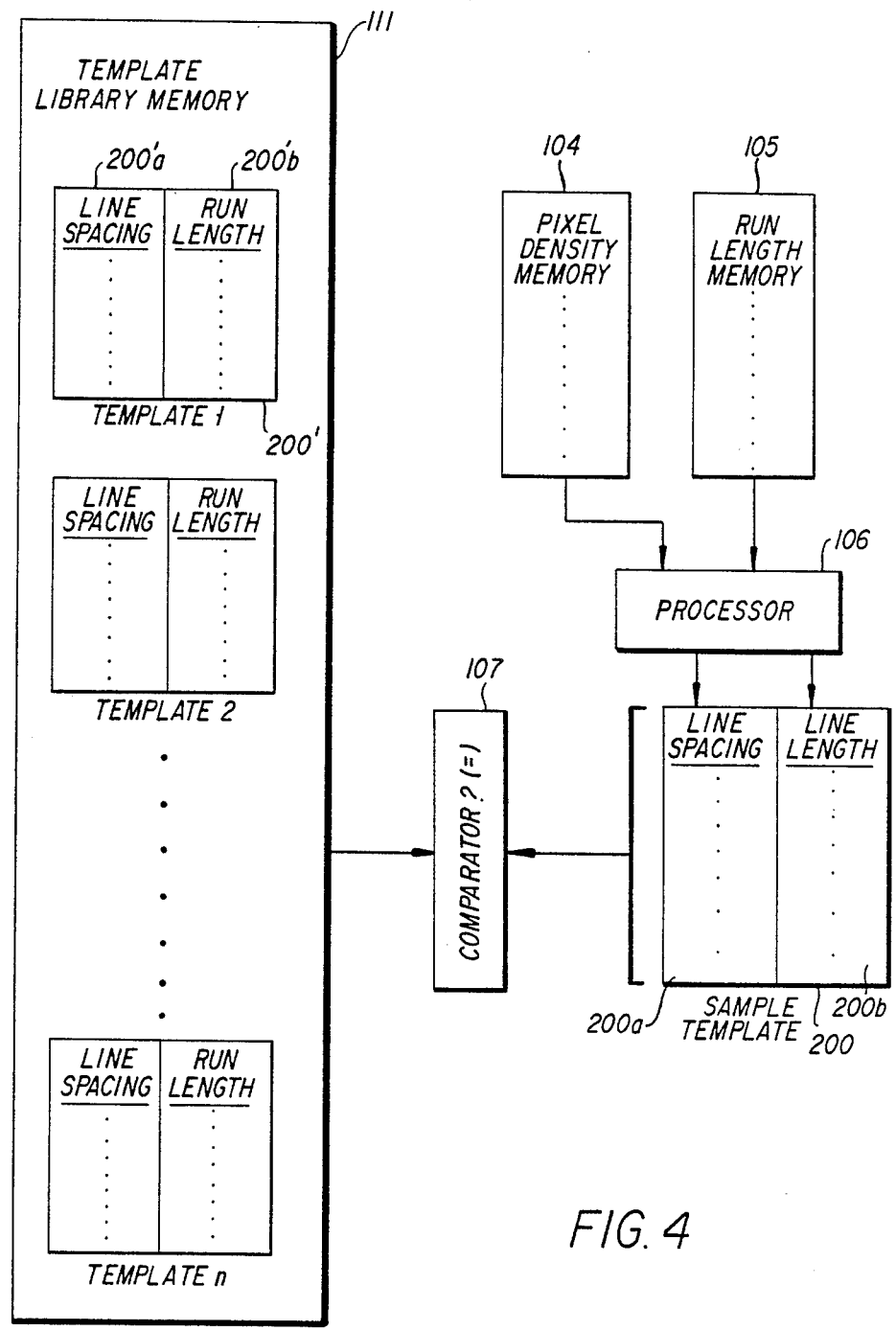
FIG. 4 is a block diagram illustrating the template library and corresponding comparison process of the system of FIG. 1.

A preferred method by which the processor 106 locates the peaks in the curve of FIG. 2 is to generate a new curve by differentiating the curve of FIG. 2. The locations of the peaks correspond in the differentiated data to discontinuities—transitions between a positively sloping curve and a negatively sloping curve—which the processor 106 finds using well-known analytical techniques or software. As illustrated in FIG. 4, the processor 106 constructs from the pre-printed line locations a list 200a of the vertical distances between adjacent pre-printed horizontal lines. In the example of FIGS. 2 and 3, the list 200a comprises the distances a, b and c illustrated in those figures. In many cases, the width of a pre-printed line will be several video lines of data, and the line location must be specified as that video line which is closest to the center of the pre-printed line image.

The processor 106 also constructs a list 200b (FIG. 4) of line lengths corresponding to the line spacings listed in the list 200a. Together, the pair of lists 200a, 200b comprise a sample template 200 characterizing the image data or document currently under consideration. A preferred method by which the processor 106 deduces, from the run length data stored in the memory 105, the line length of each line in the list 200b is to determine the longest run length in each video line listed in the table 200a.

As illustrated in FIG. 4, a comparator 107 compares the sample template with each reference template stored in a library 111 of reference templates 200' (1 through n). Each reference template in the library 111 characterizes the pre-printed line pattern of one of a plurality of business forms. As soon as the comparator 107 determines which one of the reference templates 200' matches the sample template 200, it informs the downstream optical character recognition system as to which business form the document currently under consideration corresponds.

If the comparator 107 finds more than one match, or is unable to find a match, then it instructs a processor 108 to determine which reference template 200' most closely resembles the sample template 200. A preferred method by which the processor 108 determines which of the reference templates 200' in the library 111 most closely resembles the sample template 200 is to compute the cross-correlation between each reference template and the sample template. In the preferred embodiment, two cross-correlations are computed, one based on the line spacing data in each template (tables 200a, 200'a) and the other based on the line length data in each template (tables 200b, 200'b). In accordance with this method, the two cross-correlations are combined (multiplied) to generate a single "score". A comparison of all such scores thus generated produces a "winner". Processing techniques for computing such simple cross-correlations based on horizontal line spacing patterns are well-known in the art and are not material to the invention.

The description (i.e., tables 200'a and 200'b) of the "winning" reference template 200' identified by the comparator 107 or by the processor 108 is transmitted to the down-stream optical character recognition system 300. What the optical character recognition system does with this information is beyond the scope of the present invention. However, as one example, the optical character recognition system may use the known pre-printed line configuration of the "winning" reference template to intelligently associate each field of characters in the document with a particular type of information. (For example, one field defined by a pre-printed borderline on the form document may always contain personal identification data.)

In one embodiment of the invention, rather than merely informing the optical character recognition system 300 as to the description of (or pre-printed line locations in) the winning reference template 200', a processor 110 is provided. The processor 110 uses the data in the tables 200'a, 200'b of the winning reference template 200' to mask the pre-printed line images specified therein from the incoming image data stored in the buffer 103. The processor 110 then transmits the remaining image data from the buffer 103 to the downstream optical character recognition system 300. In this way, the optical character recognition system 300 receives only character or text data, ostensibly free of non-text (pre-printed line) data which it is incapable of processing.

Figure 5:
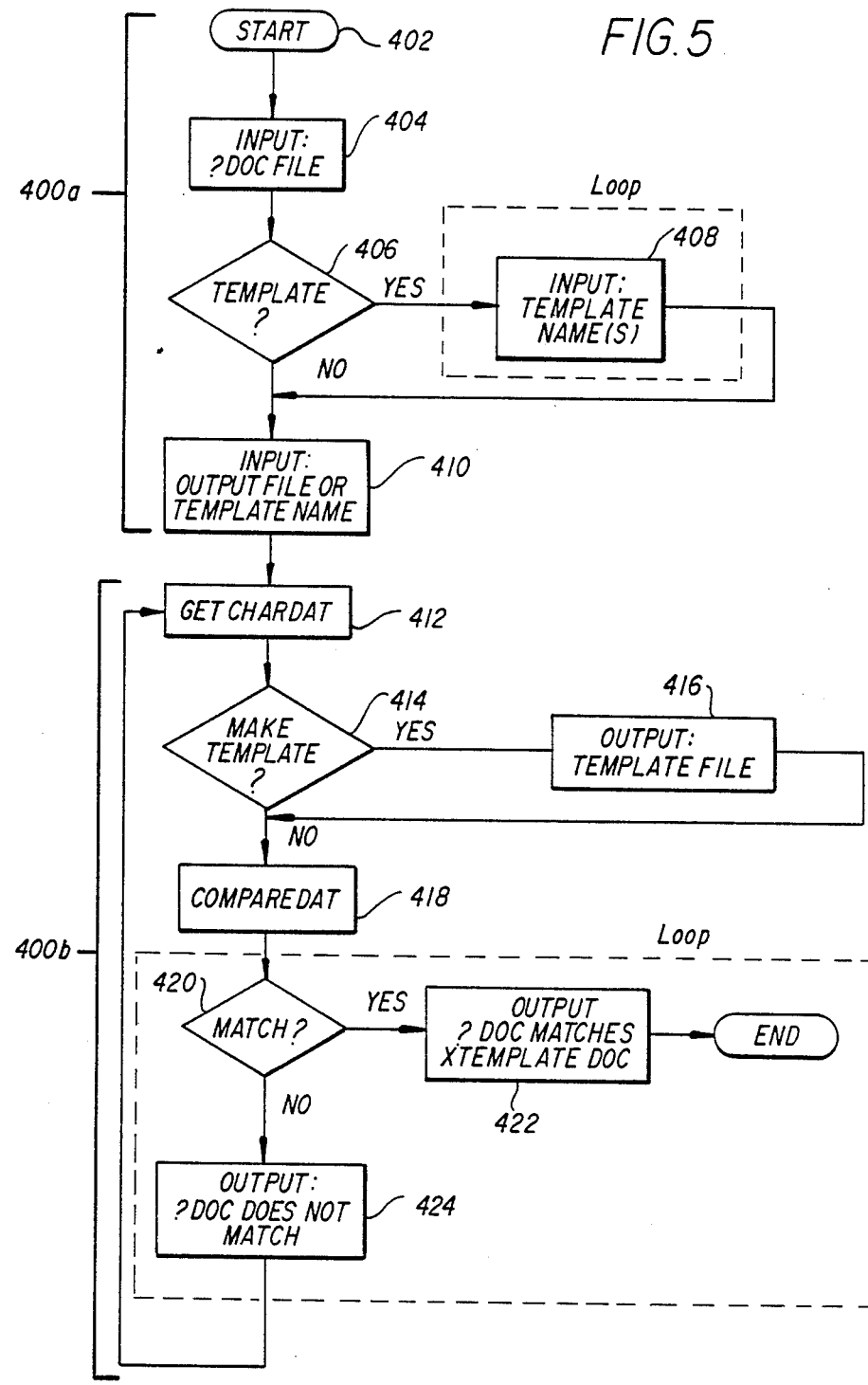
FIG. 5 is a flow chart illustrating the overall process performed by the document recognition system of FIG. 1.

FIG. 5 illustrates a process 400a for creating the library 111 of n reference templates 200' (1 through n), as well as a process 400b in which the library 111 is used by the comparator 107 and processor 108 to find a matching reference template 200' for a given sample template 200.

When the process 400a for creating the library is started (box 402), the user must input all of the business forms of interest to the system so that they may be scanned (one at a time) to generate video data representing the image of each form. The video data representing the pre-printed line image of each form is received at the node 100 in the system of FIG. 1, which processes this data in the manner previously described herein to create a sample template 200 therefrom (box 406). The difference is that the sample template thus created is not compared to anything, but instead is associated with the name of the corresponding form and is stored (along with the name) in the library 111 as a reference template 200' (box 408). Assuming that there are n business forms which the user wishes to correlate to all incoming documents, the image data of the n forms must be processed in the above manner so as to fill the library 111 with the n reference templates 200'. Once this task has been completed, there are no more reference templates to be created and stored ("NO" branch of box 406), and the library 111 of reference templates is stored in memory (box 410) so as to be ready for use in the document recognition process 400b.

The document recognition process 400b of FIG. 5 has already been described herein in terms of the operation of the system of FIG. 1, but it is instructive to summarize it here with reference to the flow diagram of FIG. 5. Once the process 400a for filling the library 111 has been completed, the incoming documents may be processed. This begins when the image of an incoming document is converted to image data (box 412). A portion of this data is processed (box 414) in the manner described previously in connection with FIG. 1 so as to generate the sample template 200 illustrated in FIG. 4. The sample template 200 is transmitted (box 416) to the comparator 107 illustrated in FIG. 4. The comparator 107 (or, in case of indefinite comparison results, the processor 108) compares (correlates) the sample template 200 with the n reference templates 200' in the library 111 (box 418). As soon as a match is found ("YES" branch of box 420) the comparator 107 (or the processor 108) declares the name of the matching reference template 200' (box 422). If the comparator 107 and the processor 108 are both unable to find a match, a flag indicating this is raised (box 424) and an additional portion of the image data of the document is requested, if available. The entire process is then repeated until enough image data is present to find a match.

While the invention has been described in detail with specific reference to preferred embodiments thereof, it is understood that variations and modifications thereof may be made without departing from the spirit and scope of the invention.

We claim:

1. A lick document character recognition system for use with an optical character recognition system, said document character recognition system comprising:
   means for storing in memory plural reference templates specifying spacings between and the lengths of pre-printed lines in corresponding plural pre-printed forms;
   means for receiving incoming video data comprising successive video lines thereof representing the image of a document of unknown form;
   means for generating a sample template from said incoming video data, said sample template specifying spacing between and lengths of pre-printed lines in said image of said document;
   means for determining which one of said plural reference templates most closely resembles said sample template;
   buffer means for storing the video data representing said one document until said determining means identifies said one reference template; and
   output processor means, responsive whenever said determining means identifies said one template, comprising (a) means for fetching the video data from said buffer means, (b) means for masking therefrom data representing pre-printed lines therein corresponding to the pre-printed line spacings and lengths in said one reference template, and (c) means for transmitting the data thus masked to said optical character recognition system.

2. The system of claim 1 wherein said plural reference templates and said sample template each specify the video line number of horizontal reprinted lines.

3. The system of claim 2 wherein said means for generating a sample template comprise:
   means for generating a curve representing the linear density of "on" pixels in said video data as a function of video line number;
   means for locating peaks exceeding a predetermined threshold in said curve and means for noting the locations of said peaks; and
   means for determining the longest runlength of "on" video pixels in each video line corresponding to each one of said peaks.

4. The system of claim 3 wherein said means for generating a sample template further translates the noted locations of said peaks into a series of numbers representing spacings between successive horizontal lines in said image.

5. The system of claim 3 wherein said means for locating peaks in said curve comprise means for producing the differential of said curve and means for noting the locations of discontinuities in said differential of said curve.

6. The system of claim 1 wherein said means for determining which one of said plural reference templates most closely resembles said sample template comprises at least one of the following:
   means for finding which one of said plural reference templates exactly matches said sample template and means for noting the identity thereof; and
   means for computing a cross-correlation between each of said plural reference templates and said sample template and means for noting which one of said plural reference templates has the highest cross-correlation with said sample template.

7. The system of claim 6 wherein said means for determining include both said means for finding an exact match and said means for computing a cross-correlation, and wherein said determining means further comprises:
   default means responsive whenever said means for finding fails to find an exact match for activating said means for computing said cross-correlation.

8. The system of claim 1 further comprising means for transmitting the contents of the one template identified by said determining means to said optical character recognition system and for means for transmitting said video data representing said one document to said optical character recognition system, whereby said optical character recognition system may associate the contents of said one template with the video data representing said one document.

9. The system of claim 1 wherein each of said templates comprises a pair of tables stored in memory, one of said tables listing spacings between subsequent pre-printed lines and the other of said tables represents the corresponding pre-printed line lengths, the contents of each of said two tables being arranged in order of the location of corresponding pre-printed lines on said image.

10. The system of claim 1 wherein said plural reference templates stored in said means for storing are generated by transmitting the image data of the corresponding plural forms in succession to said means for receiving incoming video data, whereby said means for generating a sample template generates corresponding plural sample templates comprising said plural reference templates, which may then be stored in said means for storing.

11. The system of claim 3 wherein said means for locating peaks in said curve comprise means for producing the differential of said curve and means for noting the locations of discontinuities in said differential of said curve.

12. The system of claim 1 wherein said plural reference templates stored in said means for storing are generated by transmitting the image data of the corresponding plural forms in succession to said means for receiving incoming video data, whereby said means for generating a sample template generates corresponding plural sample templates comprising said plural reference templates, which may then be stored in said means for storing.

13. A document character recognition system for use with an optical character recognition system, said document character recognition system comprising:
means for storing in memory plural reference templates specifying spacings between pre-printed lines in corresponding plural pre-printed forms;
means for receiving incoming video data comprising successive video lines thereof representing the image of a document of unknown form;
means for generating a sample template from said incoming video data, said sample template specifying spacings between pre-printed lines in said image of said document;
means for determining which one of said plural reference templates most closely resembles said sample template, wherein each of said templates comprises a pair of tables stored in memory, one of said tables listing spacings between subsequent pre-printed lines and the other of said tables representing the corresponding pre-printed line lengths, the contents of each of said two tables being arranged in order of the location of corresponding pre-printed lines of said image;
buffer means for storing the video data representing said one document until said determining means identifies said one reference template; and
output processor means, responsive whenever said determining means identifies said one template, comprising (a) means for fetching the video data from said buffer means, (b) means for masking therefrom data representing pre-printed lines therein corresponding to the pre-printed line spacings and lengths in said one reference template, and (c) means for transmitting the data thus masked to said optical character recognition system.

14. The system of claim 13 further comprising means for transmitting the contents of the one template identified by said determining means to said optical character recognition and for means transmitting said video data representing said one document to said optical character recognition system, whereby said optical character recognition system may associate the contents of said one template with the video data representing said one document.

15. A document character recognition system for use with an optical character recognition system, said document character recognition system comprising:
means for storing in memory plural reference templates specifying spacings between pre-printed lines in corresponding plural pre-printed forms;
means for receiving incoming video data comprising successive video lines thereof representing the image of a document of unknown form;
means for generating a sample template from said incoming video data, said sample template specifying spacings between pre-printed lines in said image of said document;
means for determining which one of said plural reference templates most closely resembles said sample template, wherein said plural reference templates and said sample template each specify the video line number of horizontal pre-printed lines;
wherein said means for generating a sample template comprise:
means for generating a curve representing the linear density of "on" pixels in said video data as a function of video line number,
means for locating peaks exceeding a predetermined threshold in said curve and means for noting the locations of said peaks;
buffer means for storing the video data representing said one document until said determining means identifies said one reference template; and
output processor means, responsive whenever said determining means identifies said one template, comprising (a) means for fetching the video data from said buffer means, (b) means for masking therefrom data representing pre-printed lines therein corresponding to the pre-printed line spacings and lengths in said one reference template, and (c) means for transmitting the data thus masked to said optical character recognition system.

16. The system of claim 15 wherein said means for generating a sample template further translates the noted locations of said peaks into a series of numbers representing spacings between successive horizontal lines in said image.

17. A document character recognition system for use with an optical character recognition system, said document character recognition system comprising:
means for storing in memory plural reference templates specifying spacings between pre-printed lines in corresponding plural pre-printed forms;
means for receiving incoming video data comprising successive video lines thereof representing the image of a document of unknown form;
means for generating a sample template from said incoming video data, said sample template specifying spacings between pre-printed lines in said image of said document; and means for determining which one of said plural reference templates most closely resembles said sample template;

wherein said means for determining which one of said plural reference templates most closely resembles said sample template comprises:

means for finding which one of said plural reference templates exactly matches said sample template and means for noting the identity thereof; and means for computing a cross-correlation between each of said plural reference templates and said sample template and means for noting which one of said plural reference templates has the highest cross-correlation with said sample template;

wherein said determining means further comprises:

default means responsive whenever said means for finding fails to find an exact for activating said means for computing said cross-correlation.

18. A document character recognition method for use with an optical character recognition system, said document character recognition method comprising:

storing in memory plural reference templates specifying spacings between and the lengths of pre-printed lines if corresponding plural pre-printed forms;

receiving incoming video data comprising successive video lines thereof representing the image of a document of unknown form;

generating a sample template from said incoming video data, said sample template specifying spacing between and lengths of pre-printed lines in said image of said document;

determining which one of said plural reference templates most closely resembles said sample template;

storing the video data representing said one document in a buffer until said determining means identifies said one reference template; and whenever said determining step identifies said one template, fetching the video data from said buffer means, masking therefrom data representing pre-printed lines therein corresponding to the pre-printed line spacings and lengths in said one reference template, and transmitting the data thus masked to said optical character recognition system.

19. The method of claim 18 wherein said plural reference templates and said sample template each specify the video line number of horizontal pre-printed lines.

20. The method of claim 19 wherein said generating step comprises:

generating a curve representing the linear density of "on" pixels in said video data as a function of video line number;

locating peaks exceeding a predetermined threshold in said curve and noting the locations of said peaks; and determining the longest run length of "on" video pixels in each video line corresponding to each one of said peaks.

21. The method of claim 20 wherein said generating a sample template step further comprises translating the noted locations of said peaks into a series of numbers representing spacings between successive horizontal lines in said image.

22. The method of claim 18 wherein said step of determining which one of said plural reference templates most closely resembles said sample template comprises at least one of the following steps:

finding which one of said plural reference templates exactly matches said sample template and noting the identity thereof; and computing a cross-correlation between each of said plural reference templates and said sample template and noting which one of said plural reference templates has the highest cross-correlation with said sample template.

23. The method of claim 18 further comprising transmitting the contents of the one template identified by said determining means to said optical character recognition system and transmitting said video data representing said one document to said optical character recognition system, whereby said optical character recognition system may associate the contents of said one template with the video data representing said one document.

24. The method of claim 19 wherein each of said templates comprises a pair of tables stored in memory, one of said tables listing spacings between subsequent pre-printed lines and the other of said tables represents the corresponding pre-printed line lengths, the contents of each of said two tables being arranged in order of the location of corresponding pre-printed lines on said image.

* * * * *